Patented Sept. 7, 1948

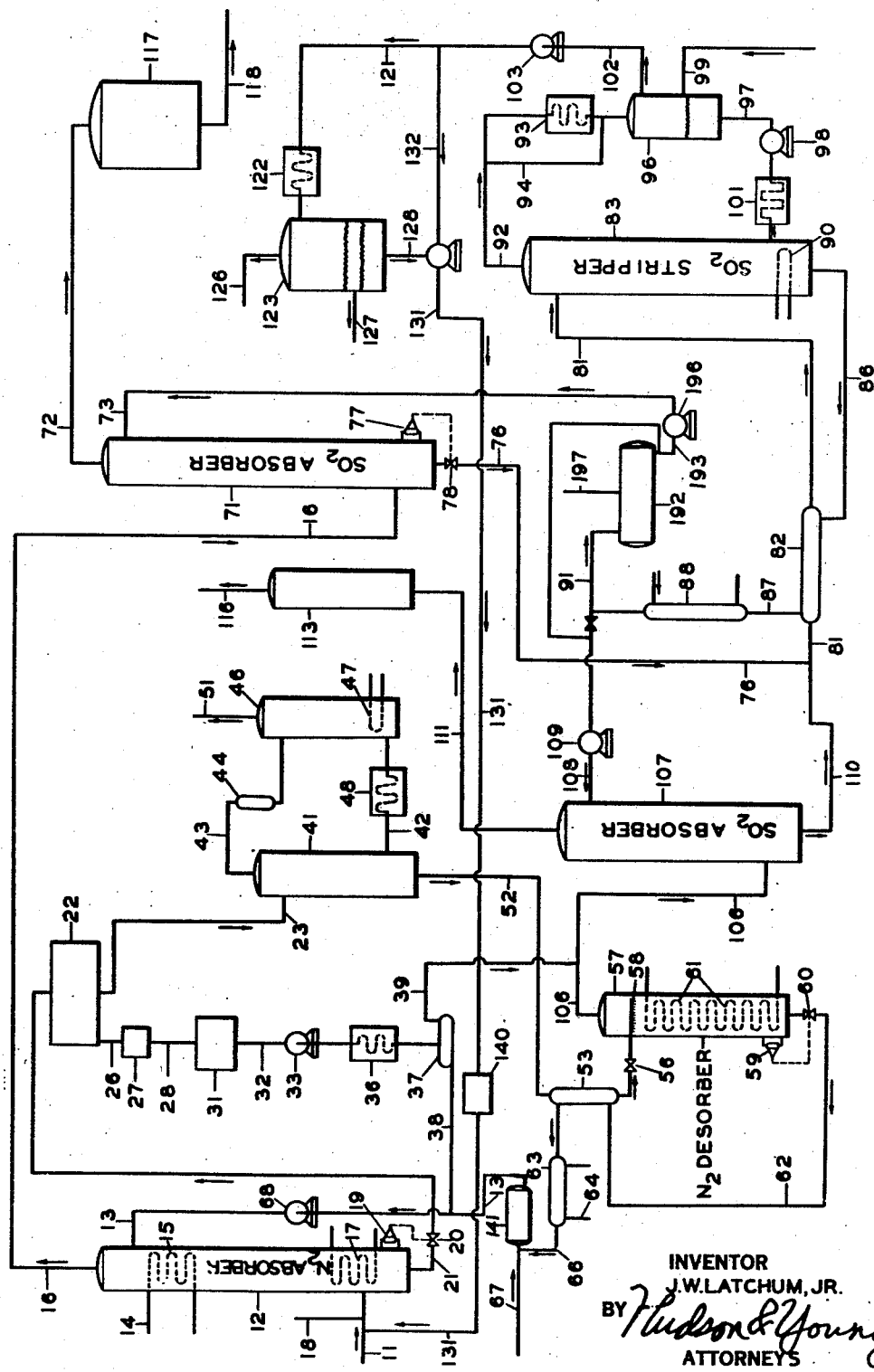

2,448,719

UNITED STATES PATENT OFFICE 2,448,719

METHOD FOR REMOVING NONCOMBUSTIBLES FROM FUEL GAS

John W. Latchum, Jr., Bartlesville, Okla., assignor to Phillips Petroleum Company, a corporation of Delaware Application December 18, 1944, Serial No. 568,766

17 Claims. (Cl. 23—3)

1

This invention relates to a treatment of fuel gases. In one of its more specific aspects it relates to a method and to apparatus for the removal of nitrogen from natural hydrocarbon gases containing this inert gas in objectionable proportions. In another specific aspect it relates to a method and to apparatus for removing nitrogen, oxygen, argon, helium and neon from artificial fuel gases, such as water gas, producer gas, blau gas or others.

As the removal of nitrogen from natural gas is by far the bigger field at present, the example chosen for illustrative purposes is natural gas, but it should be remembered any usual fuel gas may be thereby separated from nitrogen, and the term nitrogen is intended herein to include oxygen, argon, helium, neon, krypton, xenon and carbon dioxide. Whether neon, krypton, xenon, and even argon are removed or not is generally immaterial as they are usually only present in small amounts.

As natural gas comes from the earth, it frequently and in fact usually contains other gases in addition to the hydrocarbons. Occasionally, however, a well is drilled which produces largely carbon dioxide, others have been "brought in" as gas wells, the gas from which contains largely nitrogen. In most instances gases produced from wells are mixtures of many different and frequently unlike gases. A well known as a carbon dioxide well may produce in addition oxygen, nitrogen and even hydrogen sulfide. In a similar manner, nitrogen wells usually do not produce only nitrogen. Hydrocarbon producing wells are no exception to this rule and they usually produce impure "natural gas" with respect to the hydrocarbon content. These gases sometimes contain traces of oxygen, some hydrogen sulfide and mercaptan type compounds, some carbon dioxide and nitrogen. The amounts or proportions of these "impurities" vary widely. Some gases contain several percent of such materials, and a gas produced at one time in South Central Kansas contained such a large proportion of nitrogen that it burned only by the continuous application of a torch. This gas also contained 1.84% helium.

A natural gas containing as much as 10 to 20% impurity presents serious considerations when marketing is contemplated. The presence of carbon dioxide and/or nitrogen lowers the heating value of a gas merely by their presence (dilution effect) while hydrogen sulfide and/or mercaptans cause the gas to be corrosive and to possess a foul odor. Combustion products of sulfur compounds possess a disagreeable odor as well as being corrosive, especially when moist. The removal of hydrogen sulfide type of compounds from natural gas to be used in domestic heating, process work or metallurgical work is imperative.

Transportation of a natural gas containing much nitrogen or carbon dioxide by pipeline presents economic problems. For example, when transporting, say 50,000,000 cubic feet per day of a gas containing as much as 15% by volume of nitrogen through a long pipeline, the operation involves repeated compression of 7,500,000 cubic feet of the inert gas and the construction of the pipeline with a 15 per cent greater capacity than if the impurity were not present. The cost of such compressions may amount to hundreds of thousands of dollars per year. The additional capital cost of the pipeline and compression equipment for a long line may, on the other hand, be greater than the cost of a plant to remove the nitrogen.

In addition, the dilution effect of nitrogen and carbon dioxide lowers the heating value of a gas, or conversely, a gas containing one or both of these inert impurities may be "upgraded" merely by their removal. For example, a gas having a calorific value of 1000 B. t. u. per cubic foot and containing 15 per cent by volume of nitrogen will have a heating value of 1,150 B. t. u. upon removal of this nitrogen. Then also, a gas of this latter heating value can yield a considerable quantity of gasoline hydrocarbons and yet maintain a heating value of 1000 B. t. u.

I have devised a unitary, continuous process for treating such a hydrocarbon gas whereby substantially all of the nitrogen impurity is removed. The gas which I propose to treat by this process contains 15% by volume of nitrogen, some hydrogen sulfide sourness and a trace of moisture.

An object of my invention is to provide a process for the removal of relatively large amounts of free nitrogen from natural gas.

Another object of my invention is to provide a process for the removal of nitrogen from natural gas so that pipeline transportation of the gas may be carried out more economically.

Still another object of my invention is to provide a process not involving excessively high pressures nor costly low temperatures for the removal of nitrogen from natural gas.

Still other objects and advantages of my process will be apparent to those skilled in such art from a careful study of the following disclosure.

The accompanying drawing forming a part of this disclosure illustrates diagrammatically one form of apparatus in which the process of my invention may be practiced.

Referring to the drawing, raw natural gas to be treated mainly for removal of its gaseous nitrogen content enters my treating system through a line 11 directly from a production field or from an intermediate storage, not shown. For exemplary purposes, I will assume the gas to enter my treating system at an inlet pressure of approximately 720 pounds per square inch absolute, and at a temperature of from 90° to 100° F., that is, slightly above atmospheric. The gas will also be assumed to contain a very small amount of hydrogen sulfide sourness, a small amount of moisture and a usual proportion of condensible hydrocarbons such as those easily extractable and normally contained in natural gasoline. In addition to these impurities and heavier than gas hydrocarbons, the gas is assumed to contain about 15% by volume of gaseous nitrogen.

While the gas, as mentioned above, may contain H2S, moisture and gasoline hydrocarbons, it may also be free of any or all of these constituents and yet be successfully treated by the process herein disclosed. For exemplary purposes I will assume all parts and units of my system to be explained and described hereinafter to be of sufficient size and capacity as to permit processing of 50 million standard cubic feet raw gas per day of 24 hours.

For purposes of description and for being consistent throughout, all temperatures stated will be in degrees Fahrenheit, and all pressures will be in pounds per square inch absolute, unless, of course, otherwise specified.

The gas to be treated passes from the inlet line 11 directly into a main absorption column 12 at a point near its bottom. Liquid absorbent sulfur dioxide enters the column through a lean absorbent line 13 at a point near the top thereof. The absorbent enters the column under the treating pressure of about 720 pounds per square inch and at a temperature of from 90° to 100° F., and flows downwardly by gravity in countercurrent relation to upward flowing gas being treated. At this temperature and pressure substantially all of the gaseous nitrogen becomes dissolved in or absorbed by the liquid sulfur dioxide. This absorbent has an appreciable vapor pressure even in the region of 700 pounds total pressure and accordingly the treated nitrogen-free gas leaving the absorber through a treated gas outlet line 16 contains a considerable proportion of sulfur dioxide gas. Under normal operating conditions, this proportion amounts to from about 6 to 10% by volume of the treated gas.

To minimize this SO2 carryout in the treated gas I provide a cooling coil 15 in the upper portion of the absorber vessel 12; and contrary to conventional absorber construction, I provide the heating coil 17, as mentioned hereinafter. The cooling coil 15 may be cooled by circulation of refrigerant therethrough, the refrigerant, may if desired, be a portion of that circulated through the cooling coil 61 of desorber 57. It is necessary to cool the top of the absorber 12 to lower the partial pressure of the sulfur dioxide solvent and accordingly lower the amount carried out by the treated gases in an attempt to lighten the load on a subsequent step (in absorber 71) of the process.

It is necessary, then, to warm the base portion of this absorber since the solubilty of nitrogen in liquid sulfur dioxide decreases with decrease in temperature. Thus the absorbent is cooled by the combined effort of the absorption of the nitrogen and also by the vaporization of the rather volatile sulfur dioxide absorbent.

This proportion of carryout of sulfur dioxide can be decreased by operation of the absorber at a lower pressure but only at a sacrifice of absorptive capacity of the absorbent. This statement is true since the solubility of nitrogen in liquid sulfur dioxide is the reverse of the normal gas-in-liquid solubilities, that is, nitrogen gas is less soluble in liquid sulfur dioxide at lower temperatures than at higher temperatures.

On account of the relatively high vapor pressure of liquid sulfur dioxide at my preferred operating temperatures, its evaporation is quite appreciable and accordingly the liquid absorbent is considerably cooled by this evaporation. This cooling effect is conducive to poor nitrogen absorption since, as mentioned above, at lower temperatures the solubility of nitrogen in this solvent is less. To maintain at an optimum the solvent power, a heating coil 17 is inserted at a point of maximum SO2 evaporation. Thus by passing hot water or other mild heating agent through this coil temperature conditions are maintained at a favorable level.

This absorbed vessel 12 is, for the most part, of conventional design. It may be a bubble cap type vessel or a packed vessel or substantially any other type provided it is adapted to contact efficiently a gas and a liquid at the above mentioned pressure and temperature. The vessel must, of course, be constructed of materials which will not be corroded by gaseous or liquid sulfur dioxide even in the presence of traces or very small quantities of moisture.

In case the natural gas to be treated contains hydrogen sulfide, I can operate my process in such a manner as to remove this deleterious material. Under favorable conditions the following chemical reaction occurs:

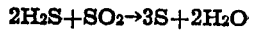
$$2H_2S + SO_2 \rightarrow 3S + 2H_2O$$

This reaction takes place readily at about 100° F. in the presence of moisture. When the original gas is substantially dry or contains too little moisture for the efficient oxidation of the hydrogen sulfide, I have provided a line 18 connected with the raw gas line inlet to the absorber whereby additional moisture can be added. The conversion of the hydrogen sulfide to free sulfur is accompanied by an equivalent amount of free sulfur from the sulfur dioxide. Sulfur from both sources then is carried in suspension in the liquid absorbent as finely divided free sulfur and I have made provision for the removal and utilization of this material.

The rich absorbent containing free sulfur in suspension is withdrawn from the base of the absorber through a line 21 and conducted to some auxiliary apparatus for removal of this sulfur. From line 21 this material passes to a sulfur removal means 22, such as a filter apparatus, centrifuge or settler. Since free sulfur is quite insoluble in liquid sulfur dioxide, the separation of the free sulfur by any suitable means is quite complete. From this separation means the filtrate or nitrogen containing absorbent passes by a line 23 to a drying or moisture removal unit while the separated sulfur passes by a conduit 26 to a drier 27 thence by another conduit 28 to a conversion means 31 wherein the free sulfur is converted or oxidized to sulfur dioxide. In this conversion step nitrogen (from air) remaining in the sulfur dioxide may, if desired, be permitted to remain therein, and the mixture passed by a conduit 32, compressed by a pump 33, cooled and condensed by a cooler 36 and finally passed into an accumulator vessel 37. From this vessel liquid sulfur dioxide is passed through a line 38 to join the main lean absorbent stream in line 13. The gaseous nitrogen accumulating in this vessel 37 obviously contains considerable uncondensed sulfur dioxide and this latter as well as the nitrogen may be reclaimed by passing this gas through line 39 to join the $N_2$—$SO_2$ mixture in a line 106, which mixture is subsequently separated into a gaseous nitrogen by-product and sulfur dioxide for recycling into the original absorber vessel 12, which steps will be fully described hereinafter.

From the previously given reaction for the oxidation of hydrogen sulfide by sulfur dioxide, it will be noted that an amount of water equivalent to the sulfur dioxide consumed was formed. This water or possibly it should be called moisture since it is formed only to a very slight extent in case only little hydrogen sulfide is present in the original hydrocarbon gas. However, sometimes this impurity is present in natural gas to the extent of several percent, in which case the sulfur dioxide obtained from such an amount is quite appreciable as is the amount of water formed from its oxidation.

Water extracted from moist gas in the original absorption step and the moisture formed from the $H_2S$—$SO_2$ reaction are best removed on account of a subsequent refrigeration step wherein the water freezes with resulting troubles. Substantially any water removing method may be used providing, of course, it is suitable for the dehydration of liquid sulfur dioxide. In case the moisture content is not excessively high, silica gel or other adsorbent driers may be used. When such are used two or more vessels may be used, while one is in dehydration service the second is on regeneration. However, in case the moisture content of the nitrogen laden absorbent is appreciable I prefer to use a liquid dehydrating agent such as ethylene glycol. Such a material as this is insoluble in liquid sulfur dioxide, insoluble or substantially so in hydrocarbons and also non-volatile at water evaporation temperatures.

In the operation of this dehydrating step, I pass the sulfur dioxide absorbent rich in dissolved nitrogen and containing some dissolved moisture from line 23 into a contacting vessel 41 at a point near its top. This contacting vessel or dehydrator may be of substantially any desired design providing it permits intimate countercurrent contact between the two above mentioned liquids. Cool absorbent, such as the ethylene glycol enters this contacting vessel from a line 42 at a point near the bottom. These two liquid materials pass in countercurrent relation to each other since the glycol introduced at the bottom is specifically lighter than the liquid absorbent. The glycol agent with its acquired charge of moisture leaves the top of this contactor through a line 43 and passes therethrough to a stripper vessel 46. This stripper vessel contains a closed heating coil 47 in which steam or other heating agent passes in indirect heat exchange with the glycol. The temperature in the base of this vessel is maintained at such a value as to expel the dissolved moisture from the glycol so that the glycol material leaving the stripper and being cooled in cooler 48 will be in a fully revivified condition and ready for additional contacting with sulfur dioxide containing moisture. Water in the form of steam leaves the stripper by the vapor line 51 for disposal as desired, while the temperature of the upper portion of this column must be sufficiently high that the water therein is kept in the vapor form and, at the same time, sufficiently low as not to vaporize the glycol absorbent. Ethylene glycol boils at about 387° F. For good operation I prefer to maintain, at a pressure of about 20 pounds absolute, the temperature in the top of the stripper 46 at about 230° F., and the base at about 300° F. I have found that operating at approximately these temperatures substantially no glycol is lost as vapor with the overhead steam and at the same time dehydration is effective so that fully dry glycol can be passed to the $SO_2$ column. Exchanger or heater 44 is installed in the wet glycol line 43 to raise the temperature of wet glycol before it enters the stripper. The hot stripper bottoms may be used as the heating medium therein. If necessary, additional heating may be supplied as necessary to raise the wet glycol to the proper temperature for passage into vessel 46. This vessel may be of substantially any design, many of which are available on the market, providing it promotes efficient water removal.

The fully or substantially dry rich absorbent (liquid sulphur dioxide) leaves the dehydrator vessel 41 by line 52 and is passed through one or more coolers represented by exchanger 53. Down to this point in absorbent flow the pressure has not been reduced under that carried in the original contactor 12 other than normal operating pressure drops on passage through pipes and treating vessels. This pressure has been maintained as stated and the temperature kept as nearly as possible to the original treating temperature in order to hold all nitrogen in solution with the sulfur dioxide. The pipe 52 carries a valve 56 which may serve as a pressure reducing valve or just a valve for ordinary operational and safety purposes. I prefer to operate nitrogen stripper vessel 57 at about 700 pounds pressure with said valve 56 substantially wide open. The rich absorbent enters the stripper vessel at a point near the top thereof and through a spray arrangement 58. In this manner the absorbent is maintained in a state of violet agitation which assists materially in expelling the nitrogen from the absorbent. Since nitrogen is considerably less soluble at sub-zero temperatures than at atmospheric, I prefer to operate my $N_2$ stripper on a reversed temperature differential, that is, absorber temperature is about 90° to 100° F. and the stripper temperature carried to from about —30° F. to —60° F. At such low temperatures the nitrogen is easily removed or stripped from the absorbent even at a pressure of 700 pounds. As mentioned above, the cooler 53 imparts considerable cooling to the rich absorbent, for example, sufficient that the absorbent has a temperature of about 10° to 15° F. Then upon entering the stripper through spray 58 some little $SO_2$ evaporation occurs imparting some additional cooling. The main cooling or chilling effect, however, is acquired from chilling coils 61 which may be chilled by such a refrigerant as propane or ethylene or other systems. The source of this refrigeration may be of conventional design and well-known in the art and, for purposes of simplicity, is not shown on the drawing.

These refrigeration coils 61 are intended to chill the $SO_2$ absorbent to at least —30° F., at which temperature the solvent has little affinity for the nitrogen gas. If desired, however, the stripper may be operated at a temperature approaching the freezing point of sulfur dioxide. At such low temperatures, economic and mechanical difficulties present themselves to such an extent that such temperatures are seldom used. It is ordinarily more economical to circulate absorbent at a somewhat increased rate rather than to strip at extremely low temperatures. In view of this consideration, I prefer to maintain the chilling coil 61 at such a temperature that the liquid absorbent leaves the base of the stripper at about −25° to −30° F. At this temperature substantially all of the nitrogen is expelled and the denuded absorbent leaves the stripper through a lean absorbent line 62 and passes in heat exchange relation with the rich absorbent (in line 52) in exchanger 53. The lean absorbent is further warmed in an exchanger or heater 63 from which it passes by a line 66 to line 13 and on into the main absorber to complete the absorbent cycle.

Overall extracting of the nitrogen from the hydrocarbon gas is a function of the nitrogen content of the sulfur dioxide absorbent entering the absorber through line 13 when equilibrium is attained on the top absorber tray. Thus as long as some nitrogen is permitted to remain in the $SO_2$ lean absorbent all the nitrogen cannot be removed from the natural gas. However, the solubility of nitrogen in liquid $SO_2$ is so small at −30° F. that approximately 97% of the nitrogen can be removed from the natural gas under equilibrium conditions in the top absorber tray.

Makeup absorbent, if and when needed, may be added through a makeup $SO_2$ line 67. A pump 68 situated in line 13 serves to force transfer of the cyclic stream of sulfur dioxide into the main absorber against the absorber operating pressure of about 720 pounds per square inch. A liquid level controller apparatus 19 in the base of the main absorber 12 serves to control the flow of rich absorbent from the absorber to the sulfur removal unit 22 by operations of a flow control valve 20. Similarly, liquid level controller 59 serves to control the flow of the denuded absorbent from the stripper by operation of a flow control valve 60 in line 62.

The warming agent entering exchanger 63 by a line 64 may be hot water, steam, or any other suitable agent as desired. A surge tank 141 should be inserted in line 13 preferably between the junction point of lines 66 and 67 and pump 68 to absorb fluctuations in liquid sulfur dioxide flow.

The main stripper of nitrogen stripper 57 is of unique construction and operation in that the top of the vessel is maintained at a higher temperature than is the base of the vessel. As mentioned above the incoming rich absorbent is at a temperature of about +10 to +15° F. while the "reboiler" section is kept at about −25° to −30° F. Thus in place of a heating coil in the base of the stripper the large cooling or refrigeration coil 61 is disposed throughout most of the length of the column. This column 57 may be a "packed" type column, or a bubble cap type vessel or any other type column provided it be so constructed and operated as to maintain the temperature of the "reboiler" section considerably lower than that of the top section.

As mentioned hereinbefore, the treated hydrocarbon gas, substantially free of nitrogen, issuing from the main absorber unit 12 through line 16 contains 6 to 10% sulfur dioxide gas. This relatively great carryout is occasioned by the relatively high treating temperature of 90° to 100° F. maintained in the main absorber to effect as nearly complete removal of the nitrogen as possible. At 100° F. sulfur dioxide has a vapor pressure of approximately 437 centimeters of mercury, which is 5¾ atmospheres or 86 pounds pressure per square inch. It is obvious that sulfur dioxide is undesirable in a fuel gas, it dilutes the B. t. u. value, and then in case the gas is used for domestic purposes, open flames could not be tolerated.

In view of these above mentioned objections and many others, it is most essential to remove this sulfur dioxide from the nitrogen free gas, and to reclaim it in such a manner that it may again be used as a nitrogen absorbent, either by itself or by recycling into the main $SO_2$ absorbent stream.

To remove the sulfur dioxide, I pass the hydrocarbon gas through an absorbent material which preferentially absorbs it, the reaction being reversed at an increased temperature for regeneration purposes. Such a material as I prefer to use is a liquid amine, for example, diethylene triamine. This amine is a liquid and possesses the property of absorbing sulfur dioxide at atmospheric temperature or thereabouts and giving up or evolving the absorbed gas at a somewhat elevated temperature, thereby making possible a cyclic process.

To carry out this step, I pass the hydrocarbon gas containing sulfur dioxide gas, said mixture originating in the main $N_2$ absorber, into the lower portion of a secondary absorber vessel 71. This absorber may be of conventional absorber design but must be constructed to withstand an operating pressure equivalent to the pressure of the gaseous charge stock from line 16. The gas under said pressure, as about 700 pounds per inch, passes upward through this absorber in countercurrent relation to down flowing amine solvent. I have found that this contacting may be efficiently carried out at substantially atmospheric temperature, or about 90° F., this latter temperature being a preferred temperature. Treated hydrocarbons, substantially free from sulfur dioxide issues through a gas line 72 to disposal as desired or to further treatment. A line 73 leads lean amine absorbent into the upper portion of the absorber while enriched absorbent leaves by a bottom line 76, the flow therethrough being regulated by a liquid level device 77 which operates a flow control valve 78 in line 76. The amine absorbent charged with the $SO_2$ passes from the outlet line 76 into another line 81, thence through a heat exchanger 82 and on through line 81 extended into the top portion of a stripper vessel 83. Fully regenerated amine absorbent passes from the base of said stripper by a line 86, through exchanger 82 and on by another line 87, through a cooler 88, another line 91 and finally into a surge tank 192. From this vessel amine passes by a bottom line 193 under suction from a pump 196 thence through line 73 into the sulfur dioxide absorber 71 to complete the amine cycle.

From the top of the $SO_2$ stripper vessel 83 the stripped gaseous $SO_2$ passes by an overhead line 92 through a cooler or partial condenser 93 into an accumulator 96. A closed coil 90 permits passage of steam for reboiling purposes. I prefer to carry a reboiler temperature of about 275° F. and a top temperature of about 160° F. To increase the efficiency of this stripping operation at as low a temperature as possible, I use a hydrocarbon material as a sort of internal reflux. An operation of this type is fully disclosed in an application for a patent, Serial No. 568,767, filed December 18, 1944, and now issued as Patent No. 2,404,854, of which I am a coinventor. In this operation an inert hydrocarbon material is used to assist in stripping sulfur dioxide from a diethanolamine absorbent.

In this present invention I desire to employ a straight run, fully saturated hydrocarbon fraction boiling from about 160° to 275° F. This hydrocarbon material is stored in an accumulator vessel 96 from the bottom of which it passes through a line 97 by influence of a pump 98, and thence through a heater or vaporizer 101 and on into the reboiler section of stripper 83. The hot hydrocarbon vapors at about 275° F. (substantially fully vaporized) rise up the stripper and on condensing in the cooler rich absorbent impart heat of condensation which in turn heats the amine—$SO_2$ solution and assists in removal of the $SO_2$. The thus condensed hydrocarbon flows down the stripper and is again vaporized in the kettle thereof by reboiler coil 90 and the hot vapors again rise to condense and to liberate additional $SO_2$. This operation is a type of internal refluxing. I operate this stripper at a pressure of from about 15 to 20 pounds per square inch absolute.

During this continuous and cyclic stripping operation, some of the hydrocarbon vapors are carried overhead from the stripper with the stream of evolved sulfur dioxide since the top stripper temperature is maintained at about 160° F. This stream of vapors, that is $SO_2$ and hydrocarbons, pass from the stripper by the vapor line 92 through the partial condenser 93 which imparts sufficient cooling to condense the hydrocarbons but not the sulfur dioxide. The condensed hydrocarbons and gaseous $SO_2$ become separated in the accumulator 96, the $SO_2$ being withdrawn therefrom through a line 102 while the hydrocarbon condensate cycles to the stripper again as stated above.

In case it is desired not to use the hydrocarbon refluxing agent, the $SO_2$ from line 92 may pass through line 94 into the accumulator thereby by passing condenser 93. In addition, a portion of the hydrocarbon—$SO_2$ vapors may be by passed through the line 94 to assist in controlling temperature of the material in the accumulator 96. Makeup hydrocarbon fraction, when necessary, may be added to the system through an auxiliary line 99 from a source, not shown.

The particular hydrocarbon fraction which I have disclosed as the internal refluxing agent was taken merely as exemplary since the boiling point range may be varied considerably from that given and yet produce the same desired results. In case a higher boiling or lower boiling fraction is used, the top stripper and reboiler temperatures are adjusted accordingly. Similarly the operation of heater 101 is so adjusted that the hydrocarbon is substantially fully vaporized so that only vapors may be passed into the base of the stripper.

Sufficient heat should be added to the hydrocarbon refluxing material by heater 101 and reboiler coil 90 that liquid hydrocarbon is not or substantially not permitted to remain in the amine stripper bottoms, so that only active amine will be passed from the stripper to the absorber 71.

This amine—$SO_2$ stripping step has been described as a portion of the absorber 71—stripper 83 cycle which continuously removes $SO_2$ from the nitrogen-free hydrocarbon gas from the original or primary absorber 12. A stripper column 57 was described in conjunction with the continuous operation of the nitrogen removing cycle. This latter stripper removes nitrogen gas from the rich sulfur dioxide absorbent coming from absorber 12. The nitrogen issuing through a line 106 also carries a quantity of sulfur dioxide vapors, the proportion of which is a function of the stripper (57) temperature and pressure. While this proportion of $SO_2$ is not especially great on account of the low temperature carried in stripper 57, yet the quantity passing out is considerable per unit of time since the volume of nitrogen desorbed from the absorbent is relatively great. In order to reclaim this sulfur dioxide, I provide an auxiliary absorber 107 wherein the sulfur dioxide laden nitrogen may be stripped of its sulfur dioxide thereby serving the double purpose of preparing a nearly pure stream of nitrogen and saving sulfur dioxide for solvent cycling purposes. A portion of the diethylene triamine absorbent stream passing through line 87 is by passed from the main line 91 to flow through a pipe 108 into the top of the auxiliary $SO_2$ absorber. This absorber is practically the same in constructional and operational details as the main $SO_2$ absorber 71. The main difference is in operation in that $SO_2$ is removed from a nitrogen containing stream in place of from a hydrocarbon stream. The nitrogen and sulfur dioxide stream passes from the stripper 57 at a pressure of about 700 pounds and enters absorber 107 at about the same pressure. Lean amine absorbent entering from line is transferred and pressured by a pump 109. The amine and $N_2$—$SO_2$ streams flow through their contactor in a countercurrent manner, the treated gas, that is nitrogen substantially free of $SO_2$, emerges through a gas line 111 while the $SO_2$ laden amine passes therefrom through a rich absorbent line 112. This latter stream joins the rich amine stream from absorber 71 and the combined stream passes through the line 81, and exchanger 82 into the $SO_2$—amine stripper 83. Thus it is seen that the two $SO_2$ absorbers 71 and 107 receive lean absorbent from the one $SO_2$ amine stripper 83.

As mentioned above the absorber 107 is operated at a pressure of about 700 pounds per square inch pressure, the exact temperature being less important. The lean amine on passing through the cooler 88 issues therefrom at a temperature of about 90° F., thus that is also the lean absorbent inlet temperature in the absorber 107. The $N_2$—$SO_2$ stream flowing into this absorber base may be at stripper 57 temperature which is −25° to −30° F., or if desired it may be warmed somewhat through a heat exchanger in case some cooling of another stream is desired, this heat exchanger is not shown on drawing for purposes of simplicity.

The nitrogen gas issuing from the $SO_2$ absorber 107 is substantially free of sulfur dioxide, but I have found that it sometimes contains traces of hydrocarbon. Since the presence of even a trace of hydrocarbon in a commercial nitrogen product is undesirable, I herein make provision for removal for same. The impure nitrogen stream passes from the absorber 107 through line 111 into an adsorber vessel 113. In this vessel is such an adsorbent material as activated charcoal or such other active material as will effectively adsorb hydrocarbons. I have found in the practice of my invention that the nitrogen stream contains from 95 to 99% of this gas with the remainder being largely such hydrocarbons as methane, ethane and even some propane. Activated charcoal effectively removes such hydrocarbons. It will be obvious that after some time on stream, the adsorbent will become fully charged or saturated with these hydrocarbons and must be taken off stream for regeneration purposes. Thus a standby adsorber, previously regenerated, is put on stream and the saturated one then may be steamed for reactivation of the charcoal and recovery of the hydrocarbons, if desired. Only one adsorbent vessel is shown, for purposes of simplicity, but it is to be understood that as many vessels may be used as necessary.

As an alternative nitrogen purification step, this vessel 113 may represent diagrammatically a mineral seal oil absorption unit such as might be used in natural gasoline extraction plants. In this alternative method, the absorption unit will consist of an absorber and a stripper and such other parts as pumps, meters, etc., as may be needed to carry out effectively the removal of the small amount of hydrocarbon from the nitrogen.

From either of these alternative purification methods, purified nitrogen gas issues by a line 116 for disposal as desired. Likewise, from either unit, the recovered hydrocarbon may be added to the main hydrocarbon product line or disposed of otherwise as desired, such disposal has not been shown on the drawing.

The main hydrocarbon stream, free from nitrogen and issuing from the top of the $SO_2$ absorber 71 may at times contain traces of sulfur dioxide gas. A vessel 117 represents diagrammatically an adsorption unit charged with an activated bauxite adsorbent or other adsorbent material suitable for the separation of traces of sulfur dioxide from hydrocarbon gases. The hydrocarbon gas passes from the absorber 71 through the overhead gas line 72 into the bauxite adsorption unit 117, the treated gas passing out through a final product line 118 to a pipeline for transportation or to intermediate storage, or other disposal as desired.

This bauxite adsorption unit may well be composed of at least two vessels containing adsorbent so that when one is "on stream" the other is being revivified for subsequent use. The revivification may be by passage of steam through the catalyst bed or by any other method as desired. Only one vessel, identified by numeral 117, is shown in the drawing but the complete unit is intended.

As mentioned hereinbefore, the $SO_2$—amine stripper tower 83 removes sulfur dioxide gas from the amine, the gas passing from the stripper through the overhead gas line 92. The use of a hydrocarbon internal refluxing agent in this stripping operation was also described. This refluxing agent is of such a boiling range that carryover in the effluent gas is condensed in condenser 93, the condensate accumulating in vessel 96. This condenser is so operated that the sulfur dioxide remains in the gaseous form and it may be withdrawn from the accumulator vessel 96 through line 102 for such recycle purposes as desired. I have found that the sulfur dioxde gas withdrawn in this line 102 contains some hydrocarbon material not included in the boiling range of the internal refluxing material. Since the sulfur dioxide should for the most part be recycled into the original absorption step, any hydrocarbon contained therein should preferably be removed previous to the recycling.

To remove such hydrocarbon the sulfur dioxide stream passing through line 102 is compressed by a pump 103 and transferred through line 121 and condenser 122 into accumulator vessel 123. The pressure imposed by this pump is such that sulfur dioxide and some hydrocarbons are condensed in condenser 122. Thus the relatively heavy liquid $SO_2$ settles to the bottom and the liquid hydrocarbon as an upper layer in the accumulator 123. Uncondensed hydrocarbon such as methane, ethane and propane are removed through a gas line 126 and disposed of as desired, for example they may be added to the nitrogen-free effluent gas passing from absorber 71 through line 72 to adsorber 117. On passing through the adsorber 117 any remaining sulfur dioxide is removed and this added hydrocarbon gas tends to bolster the B. t. u. content of the final plant effluent gas.

The liquid or condensed hydrocarbons may be withdrawn from the separator 123 by a line 127 and disposed of as desired while the liquid sulfur dioxide is withdrawn through a line 128 and passed by another line 131 into the main plant inlet gas line 11 and finally into the primary absorber vessel.

When treating a relatively dry natural gas by this process, little condensible hydrocarbon will issue with the sulfur dioxide from accumulator 96 and the step of condensing this effluent gas for separation of condensible hydrocarbons may be omitted. In such a case, it is desirable to pass the sulfur dioxide with its very small quantity of uncondensible hydrocarbon from the separator 96 through pipe 102 into compressor 103. This compressor furnishes sufficient pressure to force the $SO_2$ through a bypass line 132 into the line 131 and finally into the main plant gas inlet line 11. This gaseous sulfur dioxide recycled in this manner serves several purposes, first, sulfur dioxide is saved thereby reducing $SO_2$ chemical costs; and second, gaseous $SO_2$ is added to the incoming hydrocarbon gas thereby at least partly saturating this gas so that less $SO_2$ will be evaporated from the body of liquid solvent during passage of the hydrocarbon gas through the liquid sulfur dioxide in absorber 12. This pre-saturation of gas is especially desirable since evaporation of $SO_2$ in the primary absorber materially cools the $SO_2$ solvent and, in so doing, decreases the solubility of nitrogen gas in said solvent.

The solution or dissolving of nitrogen gas in liquid sulfur dioxide is apparently endothermic and tends to cool the solvent in the primary absorber 12. Cooling from this cause when added to cooling from $SO_2$ evaporation very materially decreases the solubility of $N_2$ in liquid $SO_2$, and under such conditions the rate of absorbent (liquid $SO_2$) circulation must be materially increased in order to absorb completely the nitrogen. By recycling the gaseous $SO_2$ from the accumulator 96 by lines 102, 132, and 131 into the original gas line 11, I am able to prevent a large part of said deleterious cooling of the absorbent $SO_2$, while coil 17 is intended to furnish sufficient heat to maintain constant the desired absorption temperature. Line 131 may preferably contain a drier 140, of suitable design, to dry the recycle $SO_2$ in case hydrocarbon gases being treated are dry and it is desired to prevent entrance of moisture in the absorber 12.

In the above discussion of the $SO_2$ absorption step in absorber columns 71 and 107, the use of diethylene triamine absorbent was described. It is possible to use other amines such as diethanol amine, or even still other amines providing they possess such properties as will permit their use for the purpose at hand.

In addition, the diethylene triamine may be mixed with some glycol and the mixture used in a manner similar to the triamine alone. The mixture in addition to absorption of $SO_2$ also removes moisture from the material being treated so that the treated material is free of acidic gas and dry from moisture. Since this glycol has a great affinity for water, as much as 10% or even more water may be permitted to accumulate in the diethylene triamine-glycol absorbent solution and yet act as an efficient drying agent. If desired, such an absorbent solution may even contain this 10% water at the start of operations.

In my aforegiven discussion relative to B. t. u. contents, nitrogen contents, etc., I mentioned that removal of nitrogen permitted extraction of appreciable quantities of high B. t. u. natural gasoline hydrocarbons. Thus the final nitrogen-free gas issuing from my process by pipe 118 may be passed to a conventional gasoline extraction plant. The operation of such a plant should be to maintain a constant and desired B. t. u. content of effluent dry gas, for example, if users desire a 1000 B. t. u. gas, then the extraction plant may be operated to produce a gas of 1005 or 1010 B. t. u. per cubic foot, or other B. t. u. content as desired. Said gasoline plant may, obviously, precede my nitrogen removal plant as well as follow it.

The operation of the primary $N_2$ absorber 12 and the $SO_2$ absorber 71 were hereinbefore described as carried out at about 720 pounds per square inch absolute pressure, which might, however, be as low as 500 pounds or as high as 1000 pounds and yet function according to my invention. I do not wish to limit such operation to these pressures since still my invention may be practiced at still higher pressures. For example, I contemplate the use of my invention in recycle or distillate fields wherein the natural gas coming from the well or from a field separator may have a pressure as high as 3000 or 4000 or even more pounds per square inch.

In the above description of an illustrative embodiment of my invention, the purification of natural gas was discussed. However, it is obvious that the usual artificial fuel gas, such as water gas, producer gas, blau gas and others may be improved by the same process. These gases generally consist of hydrogen, nitrogen, carbon monoxide and some hydrocarbons and traces of argon. The nitrogen and probably the argon are the only ones of these gases soluble in the sulfur dioxide under the conditions in tower 12 as set forth above.

The carbon monoxide and hydrogen are substantially insoluble in sulfur dioxide and otherwise react in the system substantially as the hydrocarbon elements did in the natural gas as outlined above, and thus pass through the system in the same manner, entering the system at 11 and leaving through pipe 118.

Some natural gases contain the rare gas helium. In case such a gas as contemplated for treatment as herein described contains helium gas along with nitrogen, my invention serves then a double purpose. In addition to removal of the inert, noncombustible nitrogen from the gas, helium is also removed. This step is possible since helium gas is soluble in liquid sulfur dioxide. In addition it is more soluble in the sulfur dioxide absorbent at my absorber temperature of 90° to 100° F. than it is at the stripper temperature of about −30° F. As an illustration, if a natural gas contains say 15% by volume of nitrogen and 1% by volume of helium, upon removal of all those inert gases, then same will contain 15 parts $N_2$ to 1 part He which will be over .6% by volume of helium. Such a source of helium would be a valuable one in case large quantities of such natural gas are treated.

In the appended claims the term nitrogen is intended to include nitrogen gas alone or a mixture of nitrogen gas and helium gas, the nitrogen usually being present in a relatively large proportion as compared to the helium. Nitrogen is intended also to include other inert gases, like argon.

In the above description many minor pieces of equipment have not been mentioned, nor shown on the drawing for purposes of simplicity. For example, many valves, temperature measuring and/or recording devices, flow controllers, level controllers, pressure controllers and/or recorders, and many other pieces of apparatus, the operation and use of which are well-known to those skilled in such art, are omitted. Most of the apparatus used in the practice of my invention may be of standard design and made of standard materials, but where special apparatus is needed, such is contemplated.

While substantially one set of operating conditions are described for exemplary purposes, it will be understood by those skilled in the art that such conditions may be varied within wide limits and yet remain within the intended spirit and scope of my invention.

Having disclosed my invention, I claim:

1. A process for removing nitrogen gas from fuel gas containing the same comprising the steps of contacting the fuel gas with liquid sulfur dioxide at a temperature remote from and above the melting point of sulfur dioxide and separating the contacted fuel gas from the sulfur dioxide liquid.

2. A process for removing nitrogen gas from a gaseous mixture containing hydrocarbon and nitrogen comprising the steps of contacting the gaseous mixture with liquid sulfur dioxide at a temperature remote from and above the melting point of sulfur dioxide and separating the resulting gaseous mixture from the liquid sulfur dioxide.

3. A continuous process for removing nitrogen gas from natural gas containing same comprising the steps of contacting the natural gas with a solvent of liquid sulfur dioxide at a temperature remote from and above the melting point of sulfur dioxide, separating the contacted gas from said solvent and removing dissolved nitrogen from the solvent at a temperature below said contacting temperature but above the melting point of sulfur dioxide and recycling the solvent into the contacting step at the contacting temperature and removing the contacted gas.

4. A continous process for removing gaseous nitrogen from hydrocarbon gas containing same comprising contacting the gas with a solvent of liquid sulfur dioxide at a temperature remote from and above the melting point of sulfur dioxide wherein the nitrogen passes into solution in the sulfur dioxide, separating the contacted gas as nitrogen free gas from the solvent containing the nitrogen, separating the nitrogen from said solvent at a temperature below said contacting temperature but above the melting point of sulfur dioxide and recycling the denuded solvent into the original contacting step, removing the nitrogen-free gas as the primary product of the process, and removing the separated nitrogen as a secondary product of the process.

5. A continuous process for upgrading the heating value of a natural gas containing gaseous nitrogen comprising the steps of contacting the natural gas containing nitrogen with liquid sulfur dioxide at a temperature remote from and above the freezing point of sulfur dioxide, whereby the nitrogen passes into the liquid sulfur dioxide and some sulfur dioxide vaporizes into the natural gas, separating the liquid sulfur dioxide from the natural gas, separating the nitrogen from the liquid sulfur dioxide at a temperature below said contacting temperature but above the freezing point of sulfur dioxide, and removing the nitrogen as a secondary product of the process, separating the sulfur dioxide vapor from the natural gas and removing the latter as the primary product of the process having an improved heating value.

6. A continuous process for upgrading the heating value of a natural gas containing inert nitrogen comprising the steps of contacting said natural gas with liquid sulfur dioxide at a temperature remote from but above the freezing point of sulfur dioxide, separating the natural gas containing vaporous sulfur dioxide from the liquid sulfur dioxide containing nitrogen; contacting the natural gas containing vaporous sulfur dioxide with an amine absorbent, separating the finally contacted natural gas from the amine absorbent and removing same as the natural gas of upgraded heating value.

7. A continuous process for upgrading the heating value of a natural gas containing inert nitrogen comprising the steps of contacting said natural gas with liquid sulfur dioxide at a temperature remote from but above the freezing point of sulfur dioxide, separating the natural gas containing vaporous sulfur dioxide from the liquid sulfur dioxide solvent containing nitrogen; contacting the natural gas containing vaporous sulfur dioxide with diethylene triamine, separating the finally contacted natural gas from the amine and removing the gas as the natural gas of upgraded heating value.

8. A continuous process for upgrading the heating value of a natural gas containing gaseous nitrogen comprising the steps of contacting the natural gas containing nitrogen with liquid sulfur dioxide at a temperature remote from but above the freezing point of the sulfur dioxide whereby the nitrogen passes into the liquid sulfur dioxide and some sulfur dioxide vaporizes into the natural gas, separating the liquid sulfur dioxide from the so contacted natural gas, separating the nitrogen from the liquid sulfur dioxide at a temperature below said contacting temperature but above the freezing point of the sulfur dioxide and recycling the latter into the original contacting step and removing the nitrogen as a secondary product of the process; separating the sulfur dioxide vapor from the contacted natural gas, recycling the so separated sulfur dioxide into the original contacting step at said contacting temperature and removing the latter natural gas as the primary product of the process.

9. A continuous process for upgrading the heating value of a natural gas containing gaseous nitrogen comprising the steps of contacting the natural gas containing nitrogen with liquid sulfur dioxide at a temperature remote from but above the freezing point of the sulfur dioxide whereby the nitrogen passes into the liquid sulfur dioxide and some sulfur dioxide vaporizes into the natural gas, separating the liquid sulfur dioxide from the so contacted natural gas, separating the nitrogen from the liquid sulfur dioxide at a temperature below said contacting temperature but above the freezing point of the sulfur dioxide and recycling the latter into the original contacting step and removing the nitrogen as a secondary product of the process; contacting the so treated natural gas containing sulfur dioxide vapor with diethylene triamine, separating the finally contacted natural gas from the amine and removing said gas as the natural gas of upgraded heating value and primary product of the process, treating the latter amine for removal of absorbed sulfur dioxide and separating the amine from said sulfur dioxide, recycling the amine into the original diethylene triamine and recycling the sulfur dioxide into the original contacting steps.

10. A continuous process for upgrading the heating value of a natural gas containing non-combustible nitrogen gas comprising the steps of contacting said natural gas with liquid sulfur dioxide at super-atmospheric pressure and at substantially atmospheric temperature whereby the nitrogen passes into the liquid sulfur dioxide and some sulfur dioxide vaporizes into the natural gas, separating the liquid sulfur dioxide from the natural gas containing vaporous sulfur dioxide, separating the nitrogen from the liquid sulfur dioxide at a sub-atmospheric temperature, and removing the nitrogen as a secondary product of the process, and recycling the latter sulfur dioxide into the original contacting step at substantially atmospheric temperature and at super-atmospheric pressure; separating the sulfur dioxide vapor from the contacted natural gas and removing the latter as the primary product of the process and recycling this separated sulfur dioxide into the original contacting step at substantially atmospheric temperature and super-atmospheric pressure.

11. A continuous process for upgrading the heating value of a natural gas containing non-combustible nitrogen gas comprising the steps of contacting said natural gas with liquid sulfur dioxide at superatmospheric pressure and at substantially atmospheric temperature whereby the nitrogen passes into the liquid sulfur dioxide and some sulfur dioxide vaporizes into the natural gas, separating the liquid sulfur dioxide from the natural gas containing vaporous sulfur dioxide, separating the nitrogen from the liquid sulfur dioxide at a subatmospheric temperature, and removing the nitrogen as a secondary product of the process, and recycling the latter sulfur dioxide into the original contacting step at substantially atmospheric temperature and at superatmospheric pressure; contacting the so treated natural gas containing sulfur dioxide vapors with diethylene triamine at essentially atmospheric temperature and at superatmospheric pressure wherein the sulfur dioxide vapors become absorbed in the diethylene triamine, separating the finally contacted natural gas from the amine and removing said gas as the natural gas of upgraded heating value and primary product of the process; treating the latter amine at a super-atmospheric temperature for removal of absorbed sulfur dioxide, separating said sulfur dioxide from the amine and recycling the amine into first said diethylene triamine at essentially atmospheric temperature and at superatmospheric pressure, and recycling said latter separated sulfur dioxide into the original contacting step at essentially atmospheric temperature and at superatmospheric pressure.

12. The process of claim 11 wherein the absorbed sulfur dioxide is removed from the diethylene triamine by a stripping operation employing as an internal refluxing agent a paraffinic hydrocarbon fraction boiling from about 160° to 275° F.

13. The process of claim 11 wherein the absorbed sulfur dioxide is removed from the diethylene triamine by a stripping operation employing as an internal refluxing agent a paraffinic hydrocarbon fraction boiling from about 160° to 275° and wherein this removed sulfur dioxide is recycled into the original natural gas containing noncombustible nitrogen gas to minimize evaporation of liquid sulfur dioxide in the natural gas being treated in the original contacting step.

14. The process of claim 11 wherein the nitrogen separated from the liquid sulfur dioxide at a sub-atmospheric temperature is contacted with diethylene triamine at approximately atmospheric temperature whereby the nitrogen is substantially freed of sulfur dioxide vapors and the nitrogen is removed as the substantially pure nitrogen and secondary product of the process, and heating the contacted diethylene triamine to a temperature above atmospheric temperature to liberate the absorbed sulfur dioxide, and recycling said sulfur dioxide into the original contacting step.

15. The process of claim 11 wherein the nitrogen separated from the liquid sulfur dioxide at a sub-atmospheric temperature is contacted with diethylene triamine whereby the nitrogen is substantially freed of sulfur dioxide vapors, and recycling said sulfur dioxide into the original contacting step, further treating said nitrogen by contacting with an adsorbent for removal of traces of hydrocarbon to produce a highly purified nitrogen as the secondary product of the process and removing same as said product; and further treating said upgraded natural gas by contacting with an adsorbent for removal of final traces of sulfur dioxide and removing this so treated gas as a highly purified, upgraded heating value natural gas primary product of the process.

16. The process of claim 11 wherein the original nitrogen containing gas contains hydrogen sulfide and moisture, and the original contacting step is carried out at a temperature of about 100° F. wherein the hydrogen sulfide is oxidized to free sulfur and water, and the nitrogen and free sulfur laden liquid sulfur dioxide removed from the original contacting step, removing the free sulfur therefrom and converting same to sulfur dioxide and recycling same into the original contacting step; passing the nitrogen laden water containing liquid sulfur dioxide to a dehydrating step wherein said water is removed from the nitrogen laden sulfur dioxide previous to the nitrogen removal step.

17. A process for the simultaneous removal of hydrogen sulfide and gaseous nitrogen from gaseous hydrocarbons containing moisture comprising contacting gaseous hydrocarbons containing same with liquid sulfur dioxide at a temperature remote from and above the freezing point of sulfur dioxide and removing the so treated gaseous hydrocarbons from the sulfur dioxide substantially free of nitrogen and hydrogen sulfide, and removing said hydrocarbons.

JOHN W. LATCHUM, Jr.

REFERENCES CITED

The following references are of record in the file of this patent:

UNITED STATES PATENTS

| Number | Name | Date |
|---|---|---|
| 2,128,027 | Clark | Aug. 23, 1938 |
| 2,196,281 | Voorhees | Apr. 9, 1940 |

FOREIGN PATENTS

| Number | Country | Date |
|---|---|---|
| 3,443 | Great Britain | 1881 |